(12) United States Patent
Baur et al.

(10) Patent No.: US 12,173,737 B2
(45) Date of Patent: Dec. 24, 2024

(54) CONNECTING DEVICE AND FURNITURE

(71) Applicants: Franz Baur, Oberstaufen (DE); Franz Josef Haser, Oberstaufen (DE); Lamello AG, Bubendorf (DE)

(72) Inventors: Franz Baur, Oberstaufen (DE); Franz Josef Haser, Oberstaufen (DE); Philipp Seiler, Arboldswil (CH); Patrick Jeker, Brislach (CH); Samuel Hänni, Rothrist (CH)

(73) Assignees: Franz Baur, Oberstaufen (DE); Franz Josef Haser, Oberstaufen (DE); Lamello AG, Bubendorf (CH)

( * ) Notice: Subject to any disclaimer, the term of this patent is extended or adjusted under 35 U.S.C. 154(b) by 612 days.

(21) Appl. No.: 17/474,653

(22) Filed: Sep. 14, 2021

(65) Prior Publication Data

US 2021/0404499 A1 Dec. 30, 2021

Related U.S. Application Data

(63) Continuation of application No. PCT/EP2020/061998, filed on Apr. 30, 2020.

(30) Foreign Application Priority Data

May 3, 2019 (DE) ..................... 10 2019 206 427.2

(51) Int. Cl.
*F16B 12/20* (2006.01)
*F16B 12/10* (2006.01)

(52) U.S. Cl.
CPC .......... *F16B 12/10* (2013.01); *F16B 12/2027* (2013.01)

(58) Field of Classification Search
CPC ...... F16B 12/20; F16B 12/26; F16B 12/2009; F16B 12/2027; A47B 2230/0059
See application file for complete search history.

(56) References Cited

U.S. PATENT DOCUMENTS

| 2,596,940 A | 5/1952 | Poupitch |
| 2,836,215 A | 5/1958 | Rapata |
| 2010/0111598 A1 | 5/2010 | Baur et al. |

(Continued)

FOREIGN PATENT DOCUMENTS

| CN | 108006027 A | 5/2018 |
| CN | 109477505 | 3/2019 |

(Continued)

*Primary Examiner* — Michael P Ferguson
(74) *Attorney, Agent, or Firm* — ASLAN LAW, P.C.

(57) ABSTRACT

In order to provide a connecting device which allows reliable pre-positioning without restricting too severely the freedom of movement of the components and/or articles that are to be connected together during the assembly and/or the connecting process, it is proposed that the connecting device comprise the following: a connecting element which comprises a main body that is positionable in a component; one or more spring elements for establishing a connection to a counterpart, in particular for insertion into one or more openings in a mating connecting element, wherein the one or more spring elements each comprise the following: a spring portion and/or a stabilizing portion, wherein the spring portion projects away from the main body and/or wherein the stabilizing portion extends from the spring portion in the direction of the main body.

20 Claims, 9 Drawing Sheets

(56) References Cited

U.S. PATENT DOCUMENTS

| | | | |
|---|---|---|---|
| 2013/0287484 A1 | 10/2013 | Phillips | |
| 2015/0345532 A1 | 12/2015 | Baur et al. | |
| 2016/0333911 A1* | 11/2016 | Baur | F16B 12/2027 |
| 2017/0114812 A1* | 4/2017 | Jeker | F16B 12/20 |
| 2017/0175791 A1 | 6/2017 | Baur et al. | |
| 2017/0321736 A1 | 11/2017 | Seiler et al. | |
| 2019/0128300 A1 | 5/2019 | Haser et al. | |

FOREIGN PATENT DOCUMENTS

| | | | |
|---|---|---|---|
| DE | 196 07 786 A1 | 9/1997 | |
| DE | 10 2013 203 289 A1 | 8/2014 | |
| DE | 10 2014 101 158 A1 | 7/2015 | |
| DE | 10 2014 109 547 * | 1/2016 | F16B 12/20 |
| DE | 10 2016 215 037 A1 | 2/2018 | |
| EP | 1 990 549 A1 | 11/2008 | |
| EP | 3 385 545 A1 | 10/2018 | |
| FR | 86990 E | 4/1966 | |
| JP | 2016513224 A | 5/2016 | |
| WO | WO 2012/095454 A1 | 7/2012 | |
| WO | WO 2014/060608 A2 | 4/2014 | |

\* cited by examiner

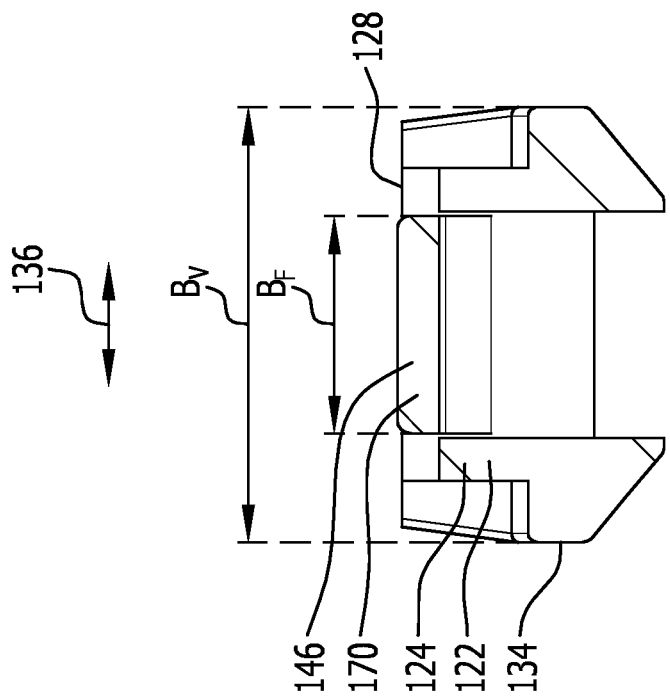
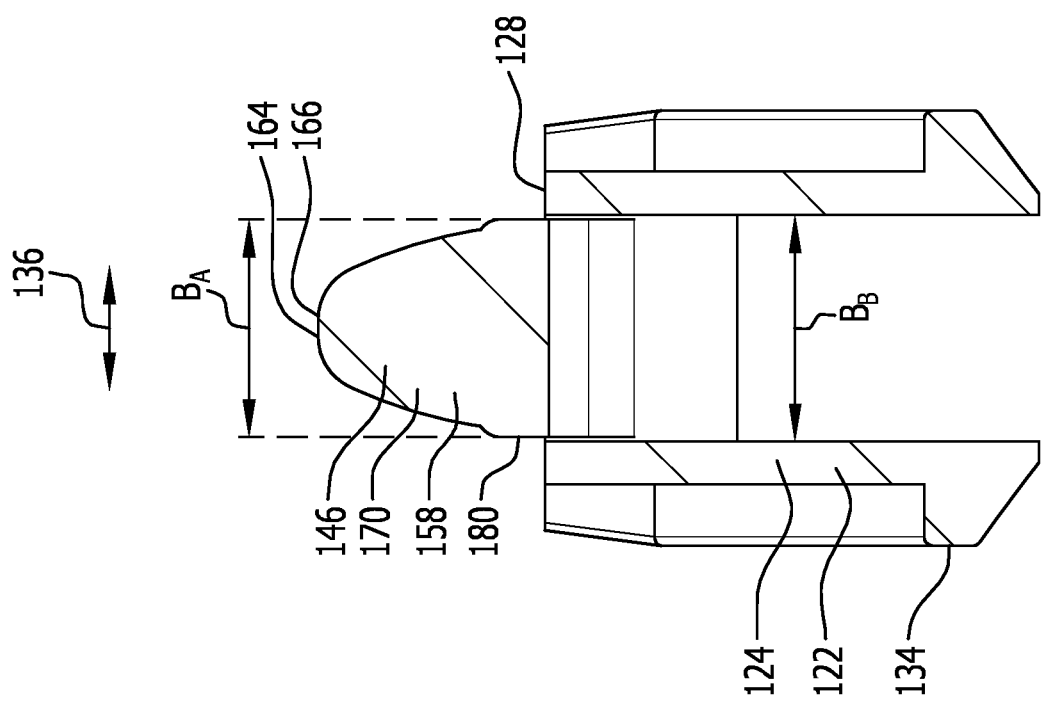

CONNECTING DEVICE AND FURNITURE

RELATED APPLICATION

This application is a continuation of international application No. PCT/EP2020/061998 filed on Apr. 30, 2020, and claims the benefit of German application No. 10 2019 206 427.2 filed on May 3, 2019, which are incorporated herein by reference in their entirety and for all purposes.

FIELD OF DISCLOSURE

The present invention relates to a connecting device for connecting a first component to a second component, in particular for connecting furniture or machine parts. Furthermore, the present invention relates to a connecting device for connecting a component to an object.

BACKGROUND

In addition, the present invention relates to an item of furniture, for example, a cupboard, a shelf, a table or some other type of furnishing and storage object.

In one connecting device known for example from EP 1 990 549 A1, provision is made for it to comprise a first connecting element that is arranged on the first component in the connected state of the components and a second connecting element that is arranged on the second component in the connected state of the components. The first connecting element comprises a main body and a retaining element that is moveable relative to the main body of the first connecting element for releasably connecting the first connecting element to the second connecting element, wherein the moveable retaining element comprises a first retaining contour, wherein the second connecting element comprises a second retaining contour which is interengagable with the first retaining contour.

In the case of the connecting device known from EP 1 990 549 A1, a first one of the connecting elements is provided with fixed plug-in projections that are insertible into reception pockets that are complementary thereto of a second one of the connecting elements. To this end, the plug-in projections must stick out from the component in a pre-mounted state of the first connecting element in which the first connecting element is fixed in or on a component. If the plug-in projections are now inserted into the reception pockets, there will be a resultant lateral fixation of the components in a plane running perpendicularly to the connecting direction of the connecting elements. As desirable as this lateral fixation process is for the purposes of reliable pre-positioning in many cases, it can however be a hindrance in other cases, for example, if a component has to be displaced along the aforementioned plane whilst resting on the other component in order to correctly position the two components relative to each other and only then fix them. The protruding plug-in projections would make a displacement of this type impossible.

SUMMARY OF THE INVENTION

The object of the present invention is to provide a connecting device which enables reliable pre-positioning to be obtained without too greatly restricting the freedom of movement of the components and/or articles that are to be connected to one another during the assembly and/or the connecting process.

In accordance with the invention, this object is achieved by a connecting device in accordance with claim 1.

In accord with the present connection, two connecting elements can be provided, in particular, a first connecting element and a second connecting element of the connecting device. As an alternative thereto however, just a single connecting element of the connecting device can be provided. This one connecting element is then that particular connecting element which is also referred to as the "first connecting element". In this case, the connecting element that is also referred to as "the second connecting element" is functionally in the form of a counterpart of any shape, such as in the form of an object or a component for example, wherein in particular this counterpart then has a portion in which one or more spring elements can spread out inside and/or on which one or more spring elements and/or retaining elements can engage.

Consequently, for the purposes of generalization, each and any counterpart that is connectible to the connecting element is referred to as a "mating connecting element", wherein this mating connecting element can be a further connecting element of the connecting device or a part or a portion of a component or an object.

A mating connecting element optionally comprises individual ones or a plurality of the features and/or advantages described in connection with the connecting element. In particular, the portions of the mating connecting element that are positionable in sunken manner in components, in particular one or more retaining projections, can correspond to those of the connecting element.

In particular, one or more connecting elements of the connecting device each comprise a main body.

The main body of a connecting element is in particular a housing of the connecting element.

In particular, the connecting direction of the connecting device is that direction in which the connecting elements and/or the components are moved towards one another in order to connect the components together.

As an alternative or in addition thereto, the connecting direction is oriented in particular perpendicularly to the surfaces of the one or more components and/or of the one or the plurality of objects with which they abut one another.

In particular, the connecting direction is that direction in which a force that is effective between the connecting element and the mating connecting element is effective in order to establish the connection between the components or objects.

Preferably, at least one connecting element comprises a housing and at least one retaining element that is moveable relative to the housing.

In a retaining position, provision may be made for the retaining element to cooperate with the mating connecting element and in particular a further connecting element such as the second connecting element for example, and/or a component or an object in such a way that a relative movement of the connecting element and the mating connecting element and/or of the at least one component and/or of the at least one object along a connecting direction is prevented.

In particular in a release position, provision may be made for the retaining element to permit a relative movement of the connecting element and the mating connecting element and/or of the at least one component and/or of the at least one object along the connecting direction.

At least one retaining element is preferably movable relative to a housing of the connecting element from the retaining position into the release position and/or from the release position into the retaining position by means of an action from outside the connecting device.

The housing of the connecting element comprises in particular a curved contact surface which is in the form of an arc of a circle in a longitudinal section and a substantially flat contact surface located opposite this contact surface which is facing the further connecting element and/or the component and/or the object.

In particular, the retaining element is arranged on the connecting element in pivotal manner. The rotary axis of the retaining element is oriented preferably substantially perpendicularly to the connecting direction.

The main body of the connecting element, in particular, a housing of the connecting element preferably comprises a through-opening through which the retaining element is accessible with a tool, in particular, an Allen key.

The rotary axis of the retaining element is preferably a centre axis of the through opening.

The retaining element comprises in particular an actuating opening on which a tool engages in order to actuate the retaining element.

In particular, the actuating opening is accessible through a side wall of the main body, in particular, of the housing.

Provision may be made for the mating connecting element to comprise at least two second retaining contours which are formed in side walls of a main body of the mating connecting element and/or are arranged thereon.

In particular, provision may be made for a respective second retaining contour to be formed in each side wall of a main body of the mating connecting element.

The two second retaining contours are preferably arranged on mutually facing inner faces of the two side walls of the main body of the mating connecting element.

It may be advantageous if the moveable retaining element comprises at least two first retaining contours which are arranged in particular on mutually opposite sides of a central portion of the retaining element.

In one embodiment of the invention, provision may be made for the moveable retaining element to comprise at least two first retaining contours and for the mating connecting element to comprise at least two second retaining contours which are formed in side walls of a main body of the mating connecting element and are interengageable with the first retaining contours, wherein the moveable retaining element is positionable or arranged between the two side walls.

In particular, provision may be made for the moveable retaining element to be placeable into a gap between the two side walls of the main body of the mating connecting element and to be removable therefrom.

The retaining element is preferably placeable between the two second retaining contours in particular in order interengage with the two second retaining contours by means of the two first retaining contours.

At least one main body of at least one connecting element is preferably in the form of an injection moulded component of plastics material.

It may be expedient if the connecting element and the mating connecting element are connected to one another in releasable manner in the connected state of the components.

At least one connecting element of the connecting device is placed into a groove that is already present in the at least one component so that, in particular, it is not necessary to apply a large amount of force when placing the connecting element into the components and consequently there is no danger of damage to the component.

In the connected state, the substantially flat contact surface of the connecting element and/or of the mating connecting element is oriented substantially perpendicularly to the connecting direction.

In particular, the curved contact surface of at least one connecting element can be in the form of a section of a substantially circular cylindrical surface.

The first retaining contour and/or the second retaining contour can, in particular, be arc-shaped.

In particular, provision may be made for the first retaining contour and the second retaining contour to be formed such as not to be mutually concentric so that the connecting element and the mating connecting element are pulled against each other when moving the retaining element from the release position into the retaining position.

For example, provision may be made for at least one retaining element to be movable from the retaining position into the release position and/or from the release position into the retaining position by means of a mechanical actuating means that is adapted to be brought into engagement with the retaining element from outside the connecting element.

For this purpose, it is expedient if at least one retaining element comprises a receptacle, in particular an actuating opening for an actuating portion of a mechanical actuating means.

In particular, provision may be made for at least one retaining element to comprise a receptacle, in particular an actuating opening for a socket spanner, an Allen key and/or a screwdriver.

In order to enable the mechanical actuating means to be effective on the retaining element, provision may be made for the connecting element to comprise a housing having a through opening for the passage of a mechanical actuating means to a retaining element.

In particular, provision may be made for the housing to comprise a side wall which extends transversely to the curved contact surface of the connecting element and the through opening is arranged in the side wall.

As an alternative thereto, provision may also be made for the through opening to be arranged on the curved contact surface of the connecting element.

In order to achieve a particularly effective anchorage of at least one of the connecting elements in the associated component, provision may be made for at least one of the connecting elements to be provided with at least one retaining projection which comprises a curved supporting surface that is in the form of an arc of a circle in a longitudinal section.

The retaining projection can be supported by means of this curved supporting surface on a likewise curved undercut surface of an undercut portion of a groove in the associated component, wherein this undercut surface is likewise in the form of an arc of a circle in a longitudinal section and has the same radius of curvature as the curved supporting surface of the retaining projection. As a result of the engagement between the retaining projection and the undercut portion of the groove, there is a positively-locking connection between the component and the connecting element.

The retaining projection of the connecting device according to the invention is preferably not formed such as to be self-cutting.

Rather, the retaining projection is preferably provided so as to be slid, in the longitudinal direction of the groove, into a groove that had already been produced before the insertion of the connecting element into the component and which has an undercut portion in the component concerned. In this case, the retaining projection can be displaced in the undercut portion of the groove in a tangential direction with little effort, so that the connecting element still possesses a certain degree of freedom of movement in this direction and thus corrections in regard to their mutual positions are still possible when connecting the components.

In particular, the retaining projection may have blunt ends and/or rounded-off lead-in bevelling in its end regions.

A non self-cutting retaining projection may have a cross-sectional area of any size in order to increase the mechanical stability of the retaining projection.

In particular, the cross-sectional area of the retaining projection can amount to at least 1 mm².

The retaining projection may have a substantially rectangular or a substantially trapezoidal cross section.

As an alternative or in addition thereto, provision may be made for at least one retaining projection to taper with increasing spacing from a main body of the respective connecting element.

On the other hand, provision may be made for at least one retaining projection to taper with decreasing spacing from a main body of the respective connecting element.

As an alternative or in addition thereto, it is also conceivable for at least one retaining projection to have a cross section having an outer contour that is curved at least in portions thereof.

Furthermore, provision may be made for at least one retaining projection to adjoin the curved contact surface of the respective connecting element such that the surfaces are substantially flush. Thus in this case, the retaining projection is arranged on the outermost edge of the associated connecting element facing the groove base.

As an alternative or in addition thereto, provision may also be made for the at least one retaining projection to be offset with respect to the curved contact surface of the respective connecting element. Thus in particular, the retaining projection can have a smaller radius of curvature than the curved contact surface of the respective connecting element.

Furthermore, provision may be made for a plurality of retaining projections having different radii of curvature to be arranged on the same connecting element. In particular, a plurality of retaining projections having different radii of curvature can be arranged on the same side of the respective connecting element.

As an alternative or in addition to an anchorage of the connecting elements by means of one or more retaining projections, provision may also be made for at least one of the connecting elements to be provided with at least one anchorage element for fixing the connecting element concerned to a groove base of a groove that is provided in one of the components.

Furthermore, provision may be made for at least one of the connecting elements to be provided with at least one anchorage screw for fixing the connecting element concerned to one of the components.

In accordance with the present invention, the connecting device comprises in particular a connecting element which comprises a main body that is positionable in a component as well as one or more spring elements for establishing a connection to a counterpart.

In particular, positioning of one component relative to a further component and/or an article can be effected by means of the one or more spring elements.

It may be expedient if one or more spring elements are insertible in one or more openings in a mating connecting element. The mating connecting element can, in particular, be a further connecting element of the connecting device or else a constituent of a component and/or an object.

Provision may be made for the one or more spring elements to each comprise a spring portion which in particular projects away from the main body.

As an alternative or in addition thereto, provision may be made for the one or more spring elements to each comprise a stabilizing portion. The stabilizing portion preferably extends from a spring portion in the direction of the main body.

Thus in particular, the stabilizing portion can be optional, in particular, in dependence on the configuration of the spring portion.

It may be expedient for the spring portion to project away from the main body and to adjoin the stabilizing portion at an end of the spring portion remote from the main body.

Furthermore, provision may be made for the stabilizing portion to extend from the end of the spring portion remote from the main body in the direction of the main body. In particular thereby, an end of the spring portion remote from the main body can be stabilized efficiently, in particular against unwanted sideways movements of the end of the spring portion remote from the main body relative to the main body.

The stabilizing portion preferably extends into the main body in a relaxed state of the spring element.

In particular, provision may be made for the stabilizing portion to comprise a foot portion in the form of a rectangular parallelepiped for example. This foot portion is arranged, in particular, at an end of the stabilizing portion remote from the spring portion and is moveable relative to the main body.

The foot portion and/or the stabilizing portion are preferably arranged and/or dimensioned in such a way that in a relaxed state of the spring element the foot portion of the stabilizing portion projects into the main body over at least approximately 10%, preferably at least approximately 30% of its length along a connecting direction of the connecting device. In this way, a lateral overlap of the stabilizing portion with the main body can be obtained, whereby an unwanted sideways movement of the spring element during the compression thereof can preferably be prevented or at least minimized.

As an alternative or in addition thereto, provision may be made in a relaxed state of the spring element for the stabilizing portion to project into the main body over at least approximately 2%, preferably at least approximately 5%, for example at least approximately 10% of its length along a connecting direction of the connecting device.

Furthermore, as an alternative or in addition thereto, provision may be made for the foot portion and/or the stabilizing portion to project into the main body in a relaxed state of the spring element over at most approximately 50%, preferably at most approximately 30%, for example, at most approximately 10% of its length along a connecting direction of the connecting device.

It may be expedient for the main body to comprise at least one spring seating for accommodating a part of at least one spring element or for accommodating at least one spring element as a whole.

In particular, the spring seating is a recess or a through opening in the main body, in particular, in an upper side of the main body that is surrounded by two side walls of the main body.

An upper side of the main body is, in particular, that side from which one or more spring elements project away.

In particular, the upper side of the main body of the connecting element is that side which is arranged facing the mating connecting element in the connected state of the connecting device.

It may be expedient if the stabilizing portion, in particular a foot portion, of the at least one spring element has a width in a direction running perpendicularly to a connecting direction of the connecting device and/or in a transverse direction of the connecting element which amounts to at least approximately 90%, in particular at least approximately 95% of the width of the associated spring seating.

In particular thereby, the transverse direction is that direction which is oriented perpendicularly to flat faces of side walls of the main body of the connecting element.

In particular, the transverse direction is parallel to a rotary axis of a retaining element.

As an alternative or in addition thereto, the transverse direction may be that direction which is perpendicular to an insertion direction along which the connecting element is insertible into a groove arranged in a component.

Furthermore, the transverse direction is, in particular, a direction running perpendicular to a maximum longitudinal extent of the connecting element.

In particular, the width of the spring seating is an interior width of the spring seating.

It may be expedient for the spring portion and the stabilizing portion to be formed and/or manufactured together in one-piece manner.

However, provision may also be made for the spring portion and the stabilizing portion to be manufactured from mutually differing materials and/or in mutually differing production steps and to be connected to one another thereafter.

In particular, the spring portion and the stabilizing portion may be in the form of a one-piece injection moulded component, for example, an injection moulded component of plastics material. As an alternative thereto, provision may be made for the spring portion and/or the stabilizing portion to be constituents of a metallic element, in particular, a sheet metal bent part.

The spring portion and the stabilizing portion preferably merge into one another in a spring projection of the spring element. The spring projection is preferably an end of the spring element that is maximally spaced from the main body, in particular, in a relaxed state of the spring element.

In particular, the relaxed state of the spring element is a maximally deflected state and/or a state in which the spring element exhibits no or only a minimum spring tension.

The spring projection is preferably a spring cap which, in particular, is rounded-off or chamfered on one side, two sides, three sides or four sides.

For example, provision may be made for an upper side of the spring projection remote from the main body to be rounded-off and/or chamfered. In particular, a one-sided, two-sided, three-sided or four-sided rounding-off or chamfering is provided on this upper side.

In particular, rounding-off and/or chamfering offers the advantage that the spring element can be moved out of an opening in a mating connecting element by simply displacing the connecting element relative to the mating connecting element in the direction of that side at which the rounding-off or chamfer is provided. By suitable selection of the number of rounding-offs or chamfers, such a simple outward movement of the spring element out of an opening in the mating connecting element can be effected in either all directions and in particular perpendicularly to the connecting direction, or in only individual directions and in particular perpendicularly to the connecting direction. For example, a fixing of the spring element in an opening of the mating connecting element that is non-detachable in exactly one direction of movement can be provided by only three-side rounding-off or chamfering.

It may be expedient if the spring element as a whole, in particular, at least in the part of the spring element projecting into an opening in a mating connecting element, widens out from the spring projection, i.e. from the end of the spring element at maximum distance from the main body, in the direction of the main body, in particular, in one, two, three, four or all of the directions running perpendicularly to the connecting direction.

As an alternative or in addition thereto, provision may be made for the spring element and in particular a part of the spring element projecting into an opening in a mating connecting element to taper from the main body, in particular, taper continuously.

One, two, three, four or all of the flanks of the spring element are preferably arranged and/or oriented such as to be inclined to the connecting direction.

As an alternative or in addition thereto, one, two, three or all four flanks of the spring element may be oriented at least approximately parallel to the connecting direction.

In particular, the spring cap is rounded-off in such a manner that, in a relaxed state of the spring element and/or in a compressed state of the spring element in which it is arranged substantially entirely in the main body and/or in all of the intermediary states therebetween, a contact portion of the spring cap with which the spring cap presses against the mating connecting element and in particular against a further connecting element, a component and/or an object in particular before expanding into an opening in the mating connecting element has a radius of curvature of at least approximately 2 mm, preferably of at least approximately 5 mm. In particular, unwanted damage to the mating connecting element and in particular to a further connecting element, the component and/or the object can thereby be avoided.

As an alternative or in addition thereto, one, two, three, four or all of the flanks of the spring element are rounded-off and/or chamfered so as to prevent in particular unwanted damage to the edges and projections on a mating connecting element and in particular a further connecting element, a component and/or an object.

It may be expedient if a retaining element of the connecting element is adapted to be brought into engagement with at least one spring element of the connecting element, in particular in such a manner that the at least one spring element is moveable from a relaxed state of the at least one spring element into a compressed state and in particular into a position located entirely within the main body by moving the retaining element from the retaining position into the release position.

Thus in particular, the one or more spring elements are themselves actuatable by actuation of the retaining element.

For example, provision may be made for the retaining element to comprise one or more engaging portions which engage the one or more spring elements in order to actuate them, in particular, move them from a relaxed state into a compressed state.

As an alternative or in addition to actuation of the at least one spring element by means of a retaining element, some other form of actuation of the at least one spring element that is independent of the retaining element could also be provided. In particular, a mechanical actuation or else a magnetic actuation can be provided, in particular in order to move the one or more spring elements from a relaxed state into a compressed state in which the at least one spring element is arranged in particular entirely in the main body.

It may be expedient for the spring portion to be in the form of a leaf spring or to comprise a leaf spring.

A leaf spring is to be understood in particular as being a spring element which comprises two mutually opposite wide sides and two mutually opposite narrow sides, wherein all of the wide sides and all of the narrow sides connect the two ends of the spring portion to one another. Preferably thereby, the wide sides have a width perpendicularly to the main direction of extent of the leaf spring which amounts to at least double, preferably at least triple, preferably for example at least approximately five times the width of the narrow sides. Hereby in particular, the width is taken perpendicularly with respect to the main direction of extent.

In a relaxed state, the spring portion is preferably curved.

It may be expedient if an end of the spring portion of the spring element facing the main body merges into the main body.

In particular, the spring portion of the spring element can be formed into the main body, formed therefrom or formed together therewith.

Preferably, an end of the spring portion facing the main body is arranged on the main body in such a manner that a side face of the spring portion which in particular is an upper side and/or a wide side is at least approximately parallel at this end to an upper side of the main body from which the spring element protrudes.

In particular, this one side face of the spring portion is curved concavely.

It can to be expedient if, in a relaxed state of the spring element, a tangent which is applied to a wide side and in particular an upper side of the spring portion at the end of the spring portion remote from the main body includes an angle with an upper side of the main body from which the spring element projects of at least approximately 20°, in particular of at least approximately 30° and/or of at most approximately 70°, preferably of at most approximately 55°.

It may be advantageous if an upper side of the spring portion at an end of the spring portion facing the main body is at least approximately flush with an upper side of the main body or is arranged underneath an upper side of the main body. In particular, this upper side of the spring portion is a wide side of a spring portion in the form of a leaf spring.

Provision may be made for the spring portion to be arranged entirely outside an outer contour of the main body.

Preferably however, provision is made for the spring portion to project into an outer contour of the main body.

Furthermore, provision is preferably made for one or more side walls of the main body bordering laterally on the spring portion to comprise one or more recesses which, in particular, are formed such as to be at least approximately complementary to the shape of the spring portion in that region in which the spring portion projects into the outer contour of the main body. A wide spring portion with correspondingly greater spring power and larger spring length can thereby be provided.

A lower side of the spring portion facing the main body preferably comprises one or more chamfered or rounded-off edges, in particular, on one or both transitions between a lower wide side of the spring portion and one or both lateral narrow sides of the spring portion.

The one or more chamfered or rounded-off edges makes it possible in particular to provide a resistance-free or at least resistance-reduced compression of the spring portion into the main body, in particular, without jamming the spring portion on the walls of the main body.

It may be expedient for the main body and the one or more spring elements to be manufactured together in one-piece.

In particular, the main body and the one or more spring elements are in the form of a one-piece injection moulded component, in particular, an injection moulded component of plastics material.

The main body and/or the one or more spring elements are formed in particular from a glass-fibre reinforced plastics material or comprise such a material.

The optional movable retaining element can likewise be in the form of an injection moulded component, in particular an injection moulded component of plastics material.

Preferably however, the movable retaining element is formed from another material, for example from a metallic material. Preferably, the movable retaining element is a die-cast zinc component.

In an alternative embodiment of the invention, provision may be made for the main body and the one or more spring elements to be formed from mutually different materials. In particular, the one or more spring elements can be formed from a metallic material and embedded into the main body or can be extruded during the production of the main body.

It may be advantageous if the width of the spring portion at an end of the spring portion facing the main body corresponds to at least approximately 20% and preferably to at least approximately 30% of the maximum width of the main body.

In particular hereby, the width is taken with respect to a direction which is oriented perpendicularly to a connecting direction and/or parallel to an upper side of the spring portion.

The connecting element preferably comprises two spring elements which, in particular, are arranged and/or formed such as to be at least approximately mutually mirror-symmetrical taken with respect to a transverse centre plane of the connecting element.

As an alternative thereto however, provision may also be made for the connecting element to comprise just a single spring element or more than two spring elements.

In particular, an optional movable retaining element is arranged between two spring elements along a main direction of extent of the connecting element insofar as two such spring elements are provided.

The connecting device can, in particular, consist exclusively of the connecting element particularly when the mating connecting element is formed by a component or some other object.

However, provision may also be made for the connecting device to comprise a mating connecting element in addition to the connecting element.

Preferably, the mating connecting element comprises one or more openings which are formed such as to be at least approximately complementary to the shape of an upper side of the at least one spring element.

Furthermore, the mating connecting element preferably comprises a retaining contour which is engagable from behind by means of the optional movable retaining element. In particular, provision may be made for the connecting device to comprise the connecting element that is arranged on a first component in the connected state of two components and a mating connecting element that is arranged on the second component in the connected state of the components.

In particular, the connecting element and/or a mating connecting element are each provided with one or more retaining projections which each have a curved supporting surface that is in the form of an arc of a circle in a longitudinal section.

In particular, the connecting element and/or the mating connecting element are fixable in one or more components or objects by means of these retaining projections, preferably, by being pushed into a groove having a shape that is complementary thereto.

Furthermore, the present invention relates to a component group which comprises one or more components and a connecting devices according to the invention.

In particular, such a component group is a piece of furniture.

The present invention therefore also relates to a piece of furniture, which comprises a plurality of components and one or more connecting devices, in particular, connecting devices according to the invention.

In particular thereby, the components of the piece of furniture are panel-like elements, in particular wooden panels which are connected or are connectible to one another by means of one or more connecting devices.

Further preferred features and/or advantages of the invention form the subject matter of the following description and the graphical illustration of exemplary embodiments.

BRIEF DESCRIPTION OF THE DRAWINGS

FIG. 3 a schematic vertical cross section through the connecting element depicted in FIG. 3 along the line 3-3 in FIG. 2;

FIG. 4 a schematic vertical cross section through the connecting element depicted in FIG. 1 along the line 4-4 in FIG. 2;

Similar or functionally equivalent elements are denoted in all of the Figures by the same reference symbols.

DETAILED DESCRIPTION OF THE DRAWINGS

Figure 7:
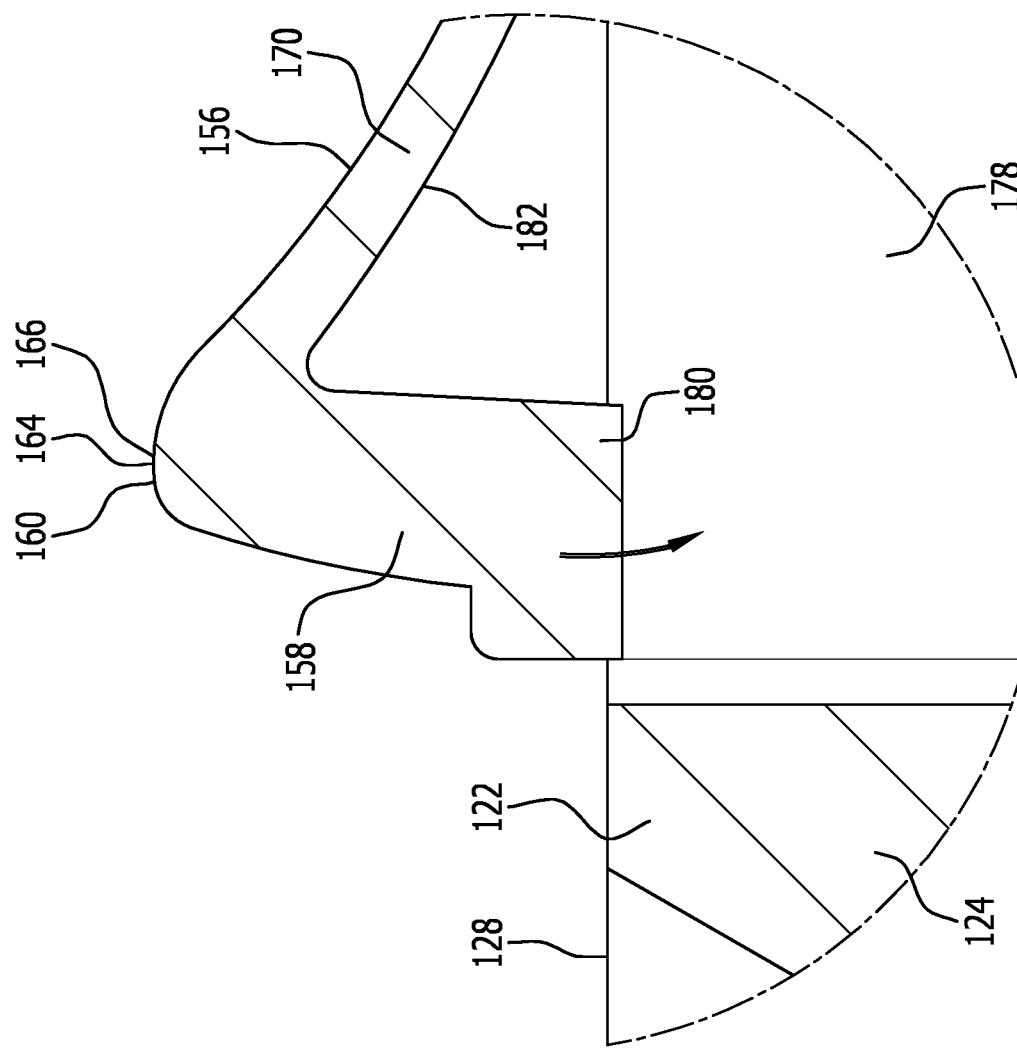
FIG. 7 an enlarged illustration of the region VII in FIG. 6.
Figure 8:
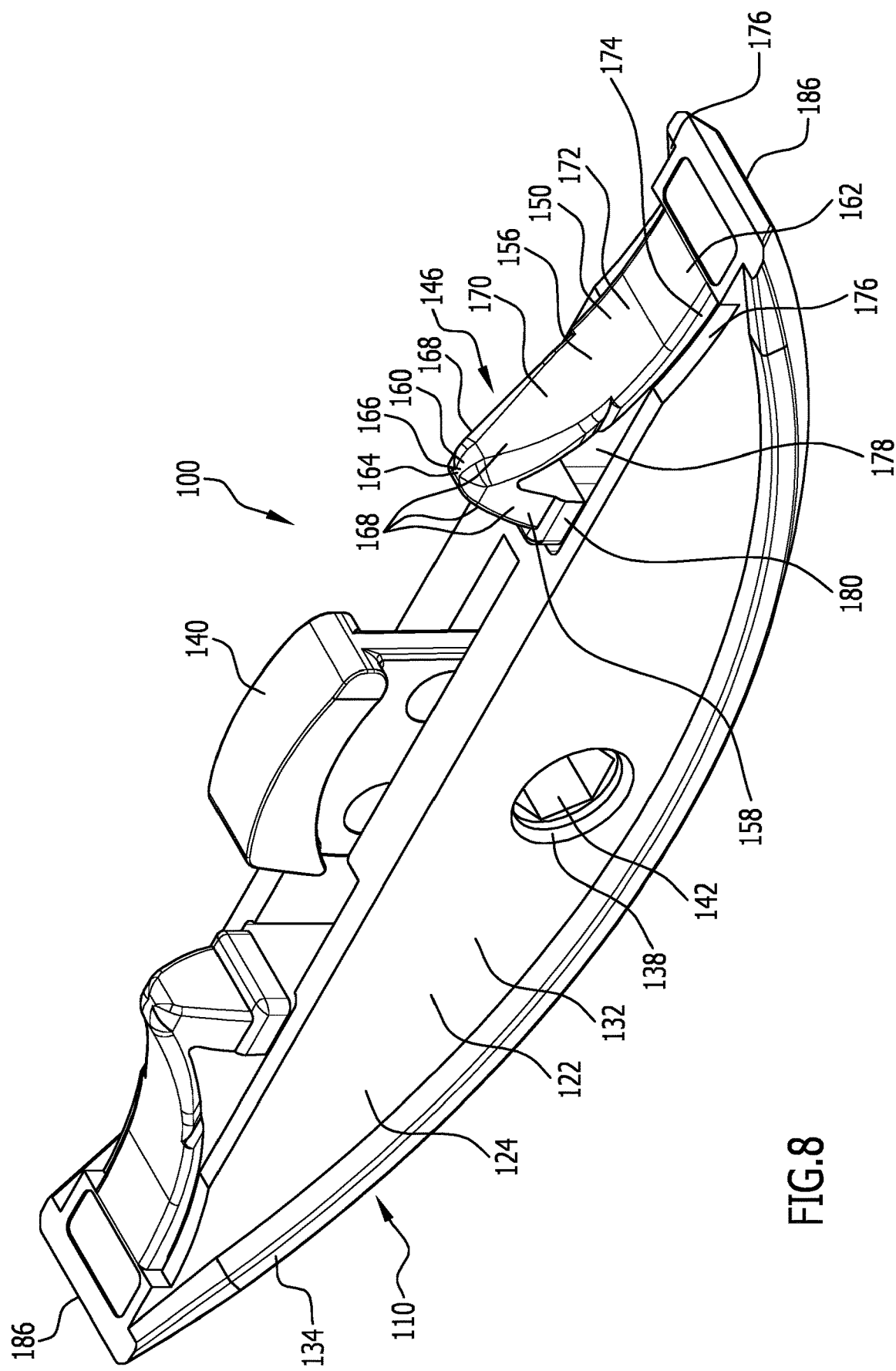
FIG. 8 a schematic illustration corresponding to FIG. 1 of the connecting element depicted in FIG. 1, wherein the movable retaining element is arranged in a retaining position.
Figure 9:
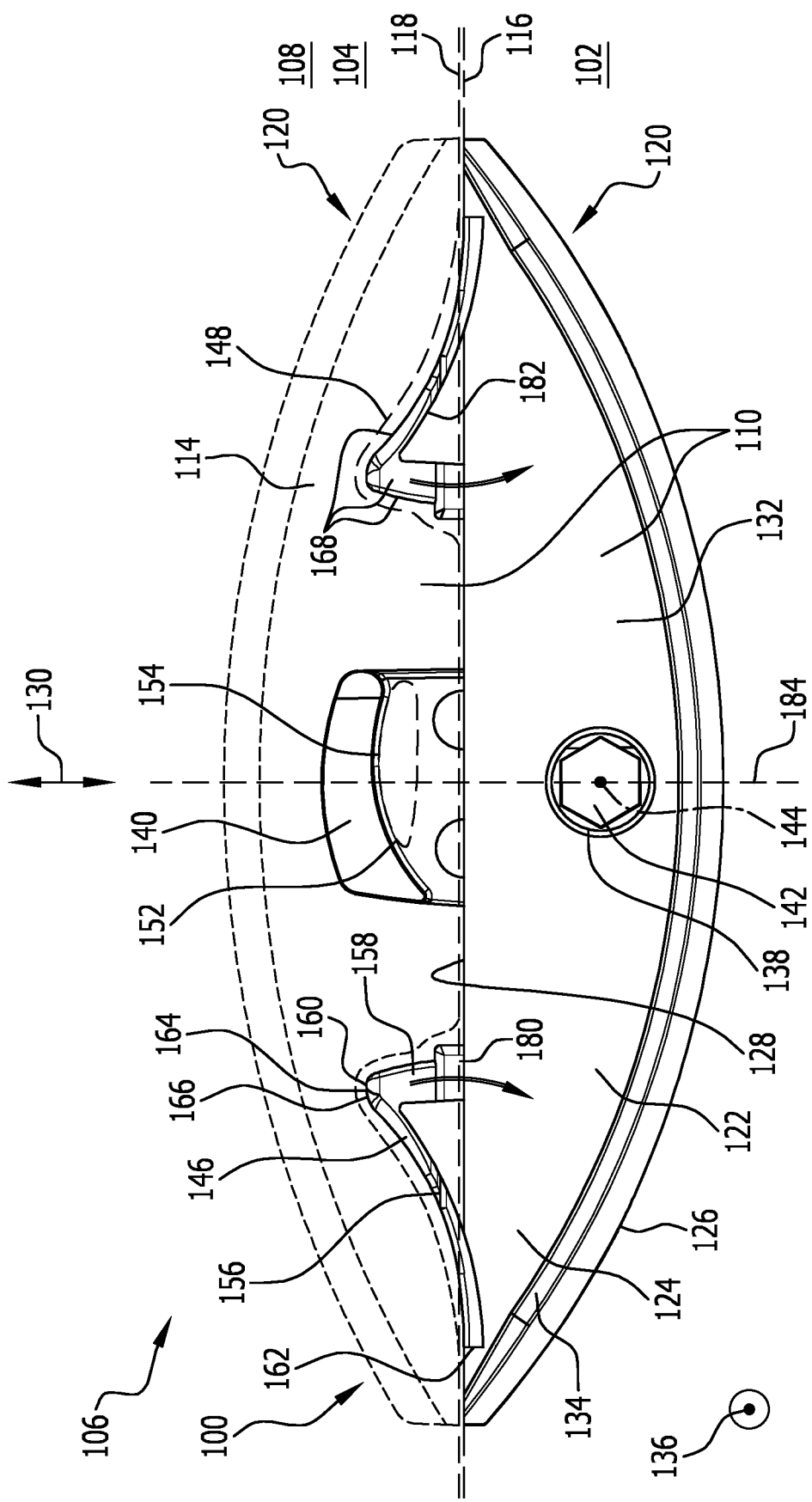
FIG. 9 a schematic side view corresponding to FIG. 2 of the connecting element depicted in FIG. 1, wherein the movable retaining element is arranged in a retaining position and wherein a mating connecting element as well as two components are indicated in a dashed-line illustration.
Figure 10:
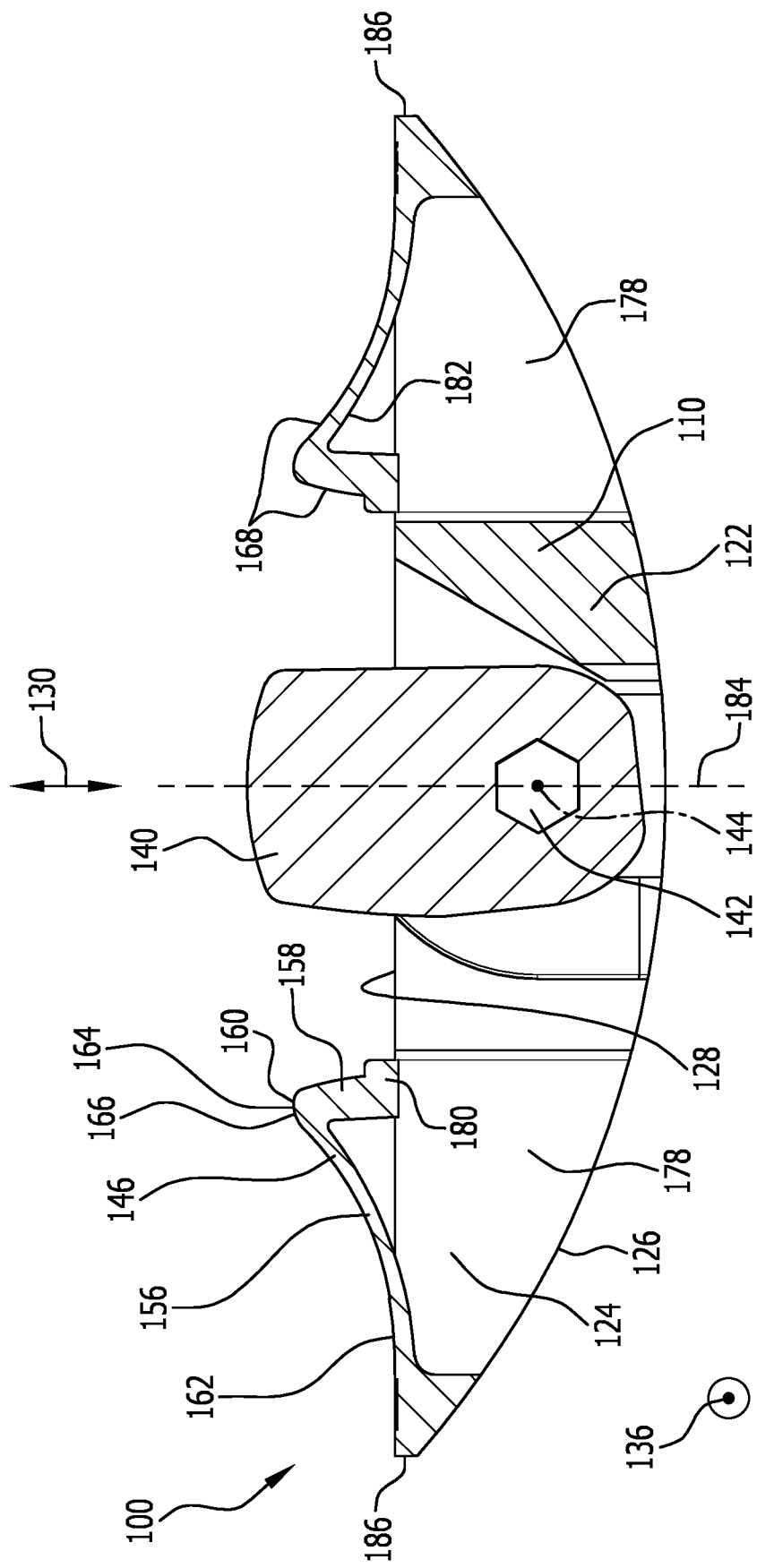
FIG. 10 a schematic sectional view corresponding to FIG. 6 of the connecting element depicted in FIG. 1, wherein the movable retaining element is arranged in a retaining position.

An embodiment of a connecting device designated as a whole by 100 that is illustrated in FIGS. 1 to 10 is described in the following on the example of a connection of a first, substantially panel-like component 102 to a second, likewise substantially panel-like component 104 (see FIG. 9).

The two components 102 and 104 consist of wood or plywood for example, but could also consist of any other materials, for example of a metallic material or a plastics material (for example Plexiglas). Furthermore, provision may be made for the first component 102 and the second component 104 to consist of mutually differing materials.

The connecting device 100 can find usage in particular in the field of furniture making for the production of furniture 106 which comprises a plurality of components 102, 104.

The connecting device 100 can however also serve for the purposes of connecting a component 102 to any other sort of object 108.

The connecting device 100 then comprises in particular just one connecting element 110 which is directly connected to or is connectible to the object 108.

In general therefore, a counterpart 112 of the connecting element 110 is referred to as a mating connecting element 114, in particular independently of whether this constituent of the connecting device 100 is connectible or connected to the component 102 or else only by using the connecting device 100.

In the following, we will go into more detail of the embodiment illustrated in FIGS. 1 to 10 in the case where, merely exemplarily, two panel-like components 102, 104 are connected to one another using a connecting device 100 (see in particular FIG. 9).

In the assembled state of the components 102, 104 that is illustrated in FIG. 9, a surface 116 of the first component 102 abuts on a surface 118 of the second component 104. The components 102, 104 are fixed in this position by means of the connecting device 100. To this end, the connecting device 100 comprises the connecting element 110 and a mating connecting element 114 which are arranged in respective mutually complementarily shaped grooves 120 that are formed in the two components 102, 104.

These grooves 120 in the components 102, 104 can be produced for example with the groove milling device which is described in EP 1 990 549 A1.

Numerous further details for the production of a connection between two components 102, 104 using a connecting device 100 are also known from EP 1 990 549 A1.

The connecting element 110 preferably comprises a main body 122. The main body 122 comprises a housing 124 that is in the form of a section of a substantially right circular cylinder which comprises an arc-shaped curved contact surface 126, an upper side 128 opposite the contact surface 126 and two side walls 132 running substantially parallel to a connecting direction 130 and substantially perpendicularly with respect to the upper side 128.

From an edge region of the side walls 132 facing the contact surface 126, there projects from the respective side wall 132 in a transverse direction 136 a respective arc-shaped curved retaining projection 134.

In particular thereby, the transverse direction 136 is oriented substantially perpendicularly to the side walls 132. Furthermore, the transverse direction 136 is oriented in particular perpendicularly to the connecting direction 130.

In at least one of the side walls 132, there is arranged a through-opening 138 through which a retaining element 140 of the connecting element 110 is accessible.

In particular, an actuating opening 142 in the retaining element 140 is accessible through the through opening 138.

The retaining element 140 is, in particular, held in the main body 122 such as to be rotatable about a rotary axis 144, whereby it is moveable from a retaining position (see in particular FIGS. 8 to 10) into and back out of a release position (see in particular FIGS. 1, 2 and 6) by actuation by means of a tool such as a hexagon key for example.

In particular, the rotary axis 144 of the retaining element 140 is parallel to the transverse direction 136 and/or perpendicular to the connecting direction 130.

In the case of the previously mentioned publication EP 1 990 549 A1, the connecting elements must first be fixed in the components 102, 104 and in particular be slid into the respective grooves 120, before the components 102, 104 can then be plugged into one another. This plug-in process is necessary in order to enable the pins of the connecting element that are permanently protruding from the one component 102 to be brought into engagement with associated receptacles in the counterpart.

Now however, there are also applications in which the components 102, 104 cannot be directly plugged into one another or be moved in some other way along the connecting direction 130 in order to establish a connection. For example, there are numerous applications in which the surfaces 116, 118 of the components 102, 104 are already abutting on one another and are then displaced relative to each other in a direction running perpendicularly to the connecting direction 130 and only then can they be fixed.

Parts of the connecting device 100 which project out from a connecting element 110 and thus protrude over a surface 116 of the component 102 get in the way of such a type of application.

Consequently, in the embodiment of the connecting device 100 that is illustrated in FIGS. 1 to 10, there are provided spring elements 146 which project out from the main body 122 of the connecting element 110 in a relaxed state but which however are arranged in the main body 122 in a compressed state.

Thus in particular, the spring elements 146 can then be moved out from a path of movement of the component 104 when this is moved relative to the component 102 whilst the surfaces 116, 118 are already abutting on one another.

One or more openings 148 are preferably arranged and/or formed in the mating connecting element 114 which in particular is arranged in the component 104.

In particular, the openings 148 can be formed at least in portions thereof such as to be complementary to an upper side 150 of each spring element 146.

Consequently, the spring elements 146 can in particular spread out into the openings 148 as soon as the components 102, 104 are positioned relative to each other in a pre-determined position and hence the connecting element 110 and the mating connecting element 114 are also arranged in a pre-determined position.

The interaction between the spring elements 146 and the openings 148 enables in particular the components 102, 104 to be pre-positioned and/or prefixed relative to each other. In particular, assembly of the connecting device 100 as a whole and/or of the furniture 106 as a whole can thereby be simplified. In particular, by appropriate dimensioning of the effective spring force it can be ensured that the components 102, 104 are then held in the openings 148 solely by the effect produced by the resilience of the spring elements 146, in particular, until the retaining element 140 of the connecting device 100 has eventually been moved out from the release position illustrated in FIGS. 1, 2 and 6 for example into the retaining position illustrated in FIGS. 8 to 10.

In particular the retaining element 140 then engages in a second retaining contour 154 of the mating connecting element 114 by means of a first retaining contour 152 of the retaining element 140 or interengages therewith, whereby locking of the connecting device 100 along the connecting direction 130 finally results (see in particular FIG. 9).

In particular too, by suitable configuration of the spring elements 146, the components 102, 104 can be separated from each other again by displacement in a direction running perpendicularly to the connecting direction 130 after the retaining element 140 is released. Alternatively, a permanent fixation in this direction could also be provided by using the spring elements 146.

In the following, there will be explained in further detail the embodiment of the spring elements 146 that is illustrated in FIGS. 1 to 10 in which in particular, provision is made for a releasable connection of the type in which the components 102, 104 are displaceable along the transverse direction 136 in order to move the spring elements 146 into the main body 122 in particular, due solely to the movement of the components 102, 104 relative to each other and thus to release the connection between the connecting element 110 and the mating connecting element 114.

Figure 1:
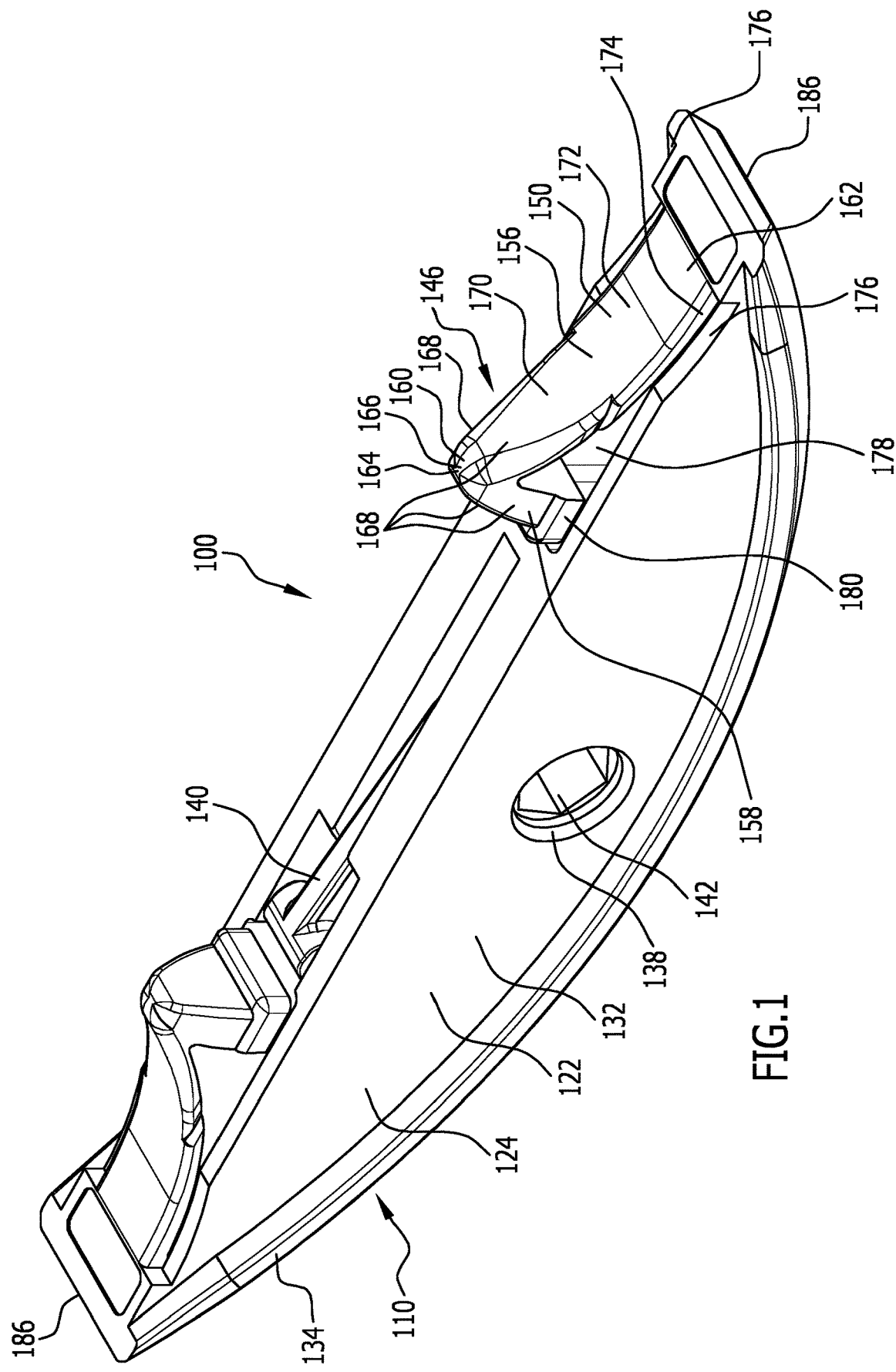
FIG. 1 shows a schematic perspective illustration of a connecting element of a connecting device, wherein a movable retaining element is arranged in a release position.
Figure 2:
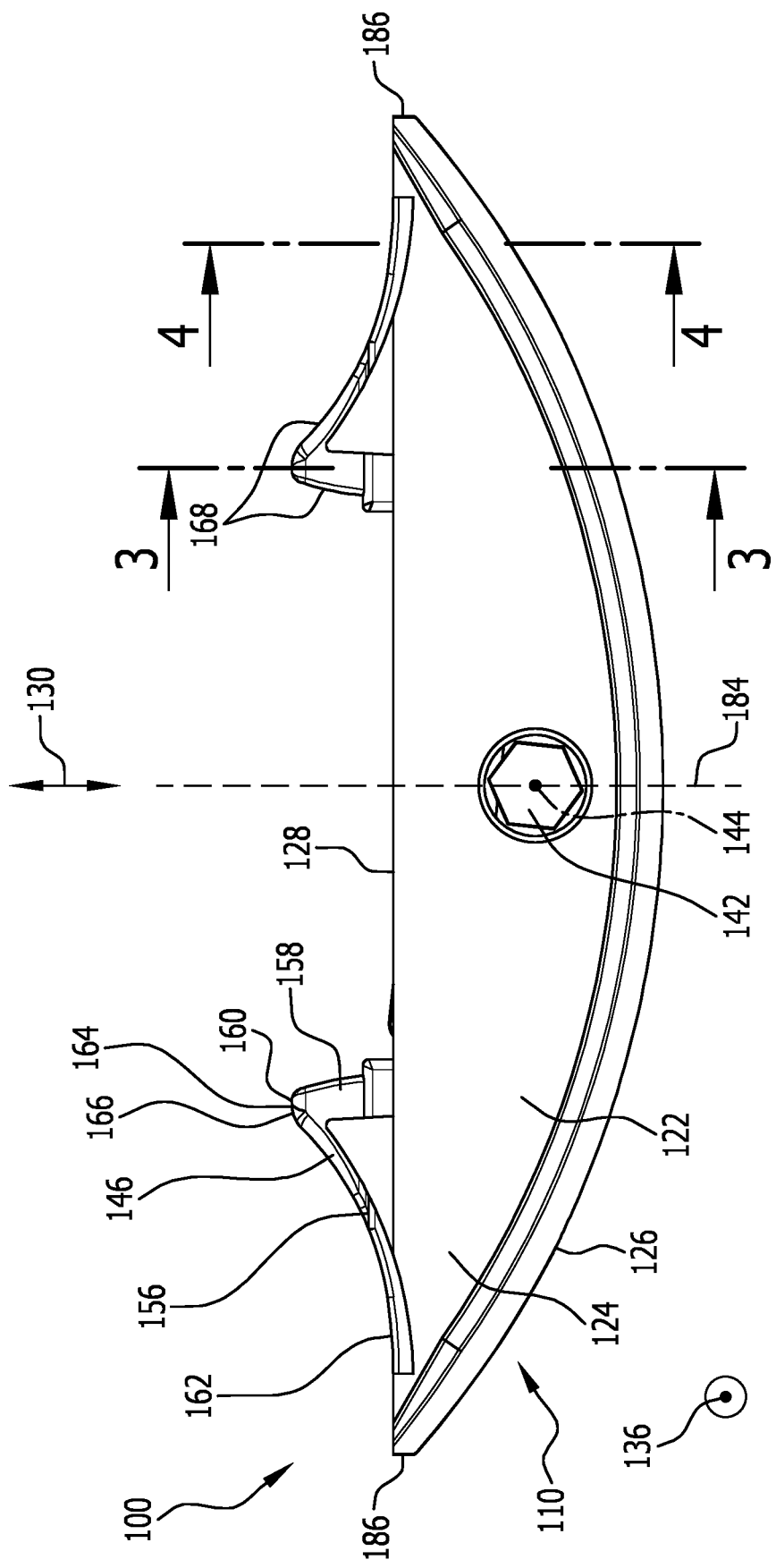
FIG. 2 a schematic side view of the connecting element depicted in FIG. 1.
Figure 5:
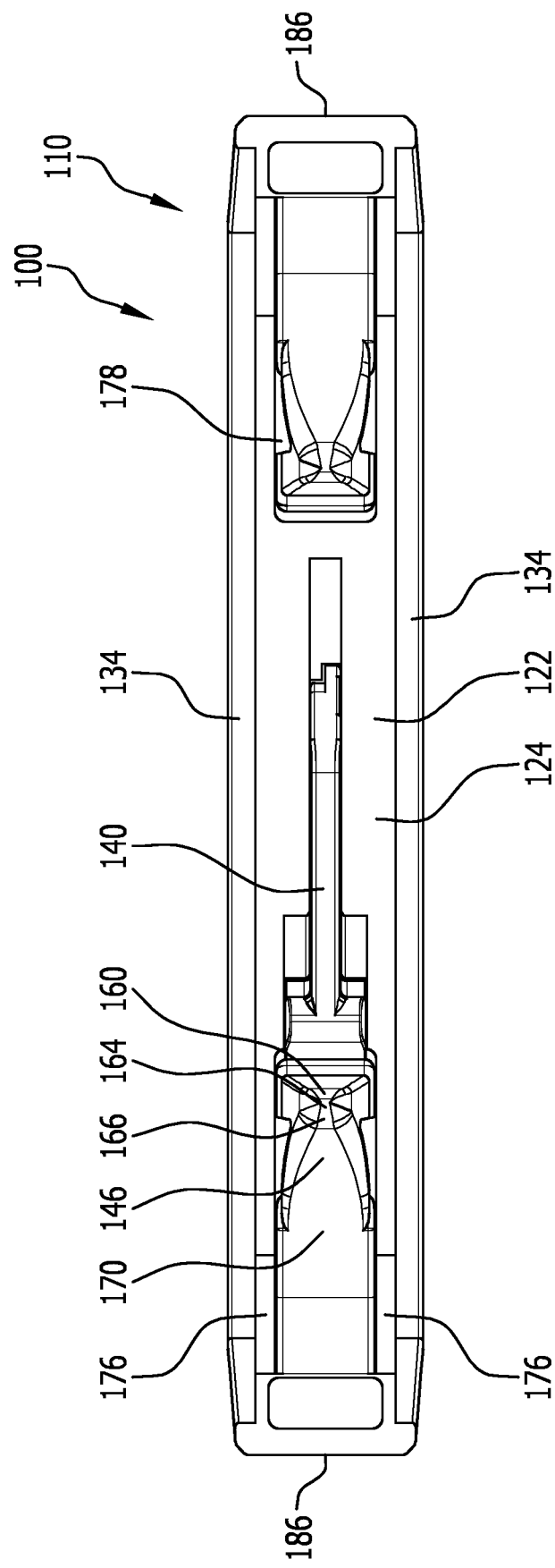
FIG. 5 a schematic plan view of an upper side of the connecting element depicted in FIG. 1.
Figure 6:
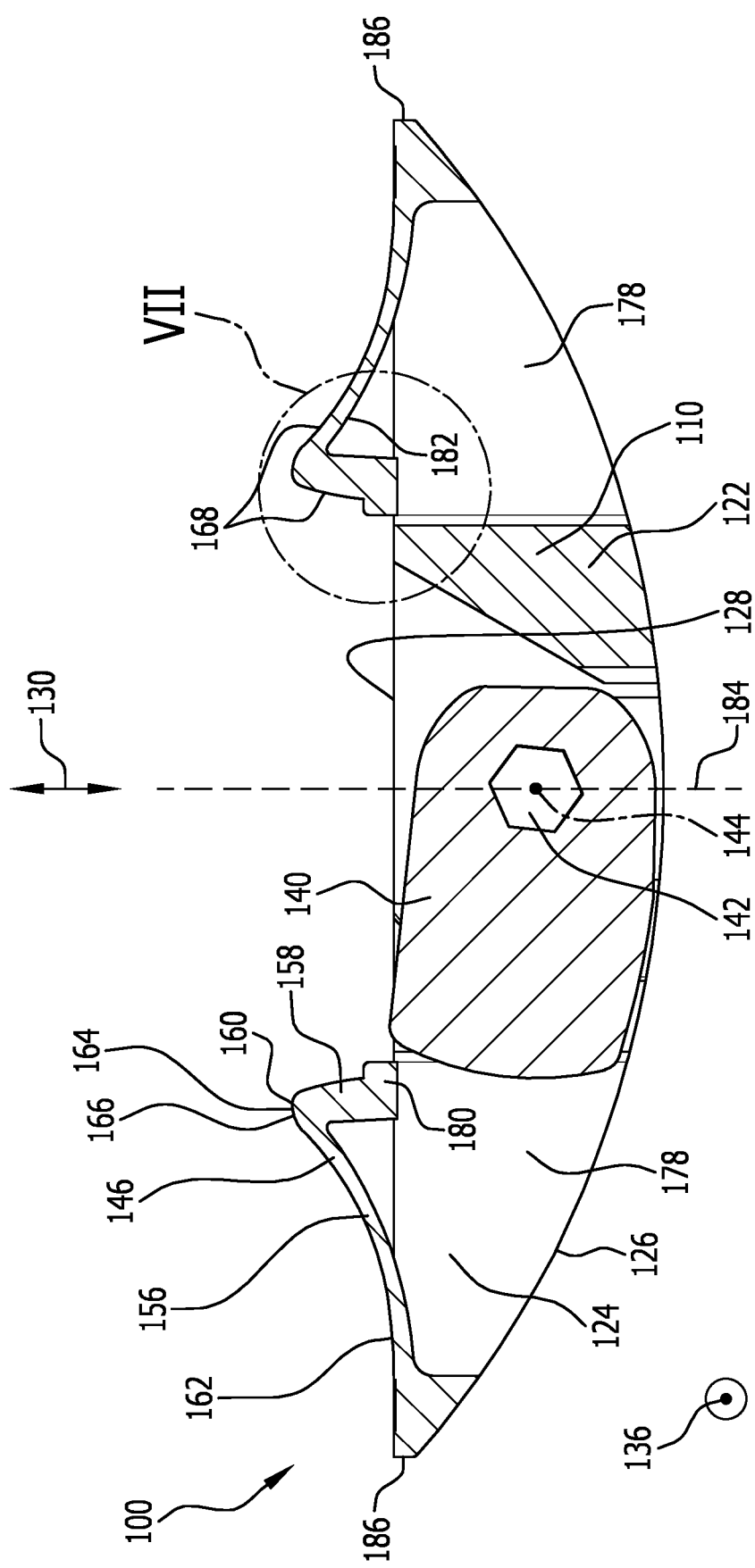
FIG. 6 a schematic vertical longitudinal section through the connecting element depicted in FIG. 1.

As is apparent in particular from FIGS. 1 and 8, each spring element 146 comprises a spring portion 156 which is arranged on the main body 122 of the connecting element 110 and projects away therefrom.

Furthermore, each spring element 146 comprises a stabilizing portion 158 which is arranged on the spring portion 156 of the respective spring element 146.

In particular thereby, the stabilizing portion 158 projects away from the spring portion 156 in the direction of the main body 122.

In particular, the stabilizing portion 158 extends from an end 160 of the spring portion 156 remote from the main body 122 at least approximately along the connecting direction 130 in the direction of the main body 122, at least in the relaxed state of the conveying element 146.

The spring portion 156 is fixed to the main body 122 at the end 162 thereof facing the main body 122. In particular, there is provided a substance-to-substance bond.

Preferably, the entire spring element 146 and the main body 122 are in the form of a one-piece injection moulded component of plastics material.

In particular, the end 160 of the spring portion 156 remote from the main body 122 forms a transition region between the spring portion 156 and the stabilizing portion 158.

Preferably, the end 160 of the spring portion 156 remote from the main body 122 is a part of the spring element 146 that is maximally distanced from the main body 122 at least in the relaxed state of the spring element 146.

Thus in particular, this end 160 of the spring portion 156 forms a spring projection 164 of the spring element 146.

The spring projection 164 is, in particular, a spring cap 166. Each spring element 146 abuts on the surface 118 of the component 104 by means of this spring cap 166 when the components 102, 104 are displaced relative to each other in a direction running perpendicularly to the connecting direction 130 until the spring elements 146 can finally enter into the openings 148.

In particular thereby, the spring caps 166 are rounded-off or chamfered in order to prevent insofar as possible unwanted damage to and in particular scratching of the surface 118.

Furthermore, the previously explained variation of the releasability of the connecting device 100 can arise from a rounding-off or a chamfering of the spring cap 166 and/or a rounding-off or chamfering of the flanks 168 of each spring element 146 adjoining the spring cap 166.

In particular when the spring cap 166 and/or all the flanks 168 are oriented at an angle to the connecting direction 130 and in particular thereby have surfaces which run along planes that intersect on a side of the spring element 146 remote from the main body 122, the spring elements 146 can easily be moved out of the openings 148 and into the main body 122, in particular, independently of the direction running perpendicular to the connecting direction 130 in which the components 102, 104 are displaced relative to each other.

In particular in the case where individual flanks 168 and/or the spring caps 166 are only partly rounded-off or chamfered, a relative movement of the components 102, 104 in one or more directions running perpendicularly to the connecting direction 130 can be blocked.

It may be expedient if it can be ensured by means of the spring elements 146 that the components 102, 104 require no further fixing once the spring elements 146 have entered into the openings 148. Preferably only for the purposes of final assembly need the optional retaining element 140 then be actuated.

The preferred temporary positioning process is ensured in particular by the large spring force of the spring elements 146.

To this end, the spring elements 146 preferably each comprise a leaf spring 170 which in particular is a constituent of the spring portion 156 or is formed thereby.

In particular, the leaf spring 170 comprises two wide sides 172 which are connected to one another by means of two narrow sides 174.

In addition, both wide sides 172 as well as both narrow sides 174 connect the ends 160, 162 of the spring portion 156 to one another.

A wide side 172 of the leaf spring 170 preferably forms an upper side 150 of the spring portion 156 and/or at least forms a constituent of an upper side 150 of the spring element 146.

As can be gathered from FIG. 4 for example, the spring portion 156 of the spring element 146 preferably extends over a width $B_F$ which amounts to at least approximately 20%, preferably to at least approximately 30% of a width $B_V$ of the connecting element 110.

In particular thereby, the width is a maximum extent along the transverse direction 136.

Furthermore, as can be gathered from FIGS. 1, 2, 8 and 9 for example, the side walls 132 of the main body 122 are respectively provided with two recesses 176 in the region of the end 162 of the spring portion 156 facing the main body 122. The spring portions 156 can thereby be formed especially wide and also especially long without the side walls 132 getting in the way. Nevertheless, an arrangement of the respective spring element 146 of this type results in the end 162 of the spring portion 156 located on the main body 122 being arranged thereon within an outer contour of the main body 122.

In particular, an upper side 150 of the spring portion 156 is flush with or even underneath the upper side 128 of the main body 122 at the end 162 facing the main body 122.

In the main body 122, there are arranged one or more and in particular two spring seatings 178 which serve in particular for receiving a respective spring element 146. In particular, exactly one spring element 146 is arranged to be accommodated in each spring seating 178.

In particular, when a spring element 146 is arranged in the spring seating 178, it no longer projects beyond an upper side 128 of the main body 122. Thus in particular, in such a position, the components 102, 104 can be displaced in directions running perpendicularly to the connecting direction 130 without the spring elements 146 obstructing this movement.

In particular in the case where the spring elements 146 are actuated relative to each other by a relative displacement of the components 102, 104, large transverse forces can result which place a load on the spring elements 146 in particularly in a transverse direction 136 and this can lead to damage of the spring elements 146.

Consequently, the spring elements 146 are provided with the stabilizing portion 158 which in particular is intended to prevent such a large load in the transverse direction 136.

To this end, each stabilizing portion 158 preferably comprises a foot portion 180.

In the relaxed state of each spring element 146, this foot portion 180 of the stabilizing portion 158 and thus too each spring element 146 projects into the main body 122 and in particular into the spring seating 178 of the main body 122 (see in particular FIG. 7).

Hereby, the foot portion 180 preferably has a width $B_A$ which corresponds at least approximately to a width $B_B$ of the spring seating 178, in particular in each case taken with respect to the transverse direction 136 (see FIG. 3).

In particular, the width $B_A$ of the foot portion 180 of the stabilizing portion 158 amounts to at least approximately 95%, preferably to at least approximately 98% of a width $B_B$ of the associated spring seating 178.

Due to the fact that the foot portion 180 of the stabilizing portion 158 always projects into the spring seating 178 and/or additionally has a very small degree of play within the spring seating 178, an unwanted sideways movement of the end 160 of the spring portion 156 remote from the main body 122 can be minimized when the components 102, 104 are displaced relative to each other in the transverse direction 136.

It therefore follows that high spring and/or holding forces can also be realized without the fear of damage to the connecting device 100 and/or the components 102, 104 in case of an intentional release of the components 102, 104 from each other.

In particular, the foot portion 180 forms a free end of the spring element 146.

The spring element 146 is preferably connected firmly to the main body 122 exclusively at the end 162 of the spring portion 156 facing the main body 122.

Finally, it can also be advantageous if the narrow sides 174 of the spring portion 156 and/or edges between the narrow sides 174 and one of the lower sides 182 of the spring portion 156 opposite the upper side 150 are tapered and/or rounded-off. In particular thereby, unwanted jamming of the spring portion 156 against the side walls 132 can be avoided when the spring elements 146 fold-in in the main body 122.

In further (not illustrated) embodiments of the connecting device 100, just one spring element 146 or possibly even more than two spring elements 146 can be provided in place of two spring elements 146.

It may be expedient but not compellingly necessary if the spring elements 146 are arranged and/or formed such as to be mirror-symmetrical to one another taken with reference to a transverse centre plane 184 of the connecting element 110.

In particular the spring elements 146 are arranged on the connecting element 110 in such a manner as to project towards one another commencing from two mutually remote ends 186 of the main body 122 of the connecting element.

However, provision may also be made for two spring elements 146 of a connecting element 110 to project away from one another commencing from the respective end 162 facing the main body 122.

In each case however, an optimal positioning of the components 102, 104 relative to each other preferably results due to the use of at least one spring element 146, in particular, by enabling displacement of the components 102, 104 relative to each other whilst the surfaces 116, 118 of the components 102, 104 are already abutting on one another.

LIST OF REFERENCE SYMBOLS 100 connecting device
102 first component
104 second component
106 furniture
108 object
110 connecting element
112 counterpart
114 mating connecting element
116 surface
118 surface
120 groove
122 main body
124 housing
126 contact surface
128 upper side
130 connecting direction
132 side wall
134 retaining projection
136 transverse direction
138 through opening
140 retaining element
142 actuating opening
144 rotary axis
146 spring element
148 opening
150 upper side
152 retaining contour
154 second retaining contour
156 spring portion
158 stabilizing section
160 end
162 end
164 spring projection
166 spring cap
168 flank
170 leaf spring
172 wide side
174 narrow side
176 recess
178 spring seating
180 foot portion
182 lower side
184 transverse centre plane
186 end
width $B_F$
width $B_V$
width $B_A$
width $B_B$

The invention claimed is:

1. A connecting device for coupling furniture components, comprising:
a connecting element which comprises a main body that is positionable in a corresponding groove in a first furniture component, the main body comprising a housing having a semi-cylindrical disc shape having a pair of opposing semi-circular side walls, an arcuate rear side wall and an upper side wall defining a hollow interior therein;
one or more spring elements for matingly engaging one or more corresponding openings in a mating connecting element positioned in a corresponding groove in a second furniture component, each spring element comprising:
a resilient spring portion which projects away from the upper side wall of the main body,
a spring projection disposed at a distal end of the spring portion for engaging the corresponding opening in the mating connecting element, and
a stabilizing portion integrally formed with the spring portion, which extends from the spring projection in the direction of the main body,
wherein the main body comprises at least one spring seating, each spring seating comprising an opening in the upper side wall for accommodating a respective one of the at least one spring elements,
wherein the spring element is compressible through the spring seating, completely within the hollow interior, such that the spring projection no longer projects beyond the upper side of the main body, and
wherein, during assembly of the first and second furniture components, corresponding surfaces of the components are able to abut one another in an assembly direction such to compress the spring elements completely within the interior housing, and the components are able to be relatively displaced in a transverse direction until the spring elements are aligned with and resiliently project into the corresponding openings in the mating connecting element; and
a retaining element rotatably disposed within the hollow interior of the main body about an axis extending between the opposing side walls, the retaining element rotatable between a release position in which the retaining element is completely retracted within the hollow interior during assembly of the components, and a retaining position in which the retaining element extends through an opening in the upper side wall and lockably engages a corresponding retaining contour in the mating connecting element to couple the components.

2. The connecting device in accordance with claim 1, wherein the spring portion projects away from the main body and borders on the stabilizing portion at an end of the spring portion remote from the main body and wherein the stabilizing portion extends in the direction of the main body from the end of the spring portion remote from the main body.

3. The connecting device in accordance with claim 1, wherein the stabilizing portion extends into the main body in a relaxed state of the spring element.

4. The connecting device in accordance with claim 1, wherein the stabilizing portion of the at least one spring element in a direction running perpendicularly to a connecting direction of the connecting device and/or in a transverse direction has a width ($B_A$) which amounts to at least approximately 90%, or at least approximately 95% of the width ($B_B$) of the associated spring seating.

5. The connecting device in accordance with claim 1, wherein the spring projection is a spring cap which is rounded-off or chamfered on one side, two sides, three sides or four sides.

6. The connecting device in accordance with claim 1, wherein the spring portion is in the form of a leaf spring.

7. The connecting device in accordance with claim 1, wherein an end of the spring portion of the spring element facing the main body merges into the main body.

8. The connecting device in accordance with claim 1, wherein an end of the spring portion facing the main body is arranged on the main body in such a manner that an upper side of the spring portion at the end is at least approximately parallel to the upper side wall of the main body.

9. The connecting device in accordance with claim 1, wherein the spring portion comprises two wide sides and two narrow sides which connect the respective two ends of the spring portion to one another.

10. The connecting device in accordance with claim 1, wherein the spring portion is curved in a relaxed state of the spring element.

11. The connecting device in accordance with claim 1, wherein a tangent, which, in a relaxed state of the spring element, is applied to the end of the spring portion remote from the main body at a wide side or the upper side of the spring portion, includes an angle with the upper side wall of the main body of at least approximately 20°, or of at least approximately 30° and/or of at most approximately 70°, or of at most approximately 55°.

12. The connecting device in accordance with claim 1, wherein an upper side of the spring portion at an end of the spring portion facing the main body is at least approximately flush with the upper side wall of the main body or is arranged underneath the upper side wall of the main body.

13. The connecting device in accordance with claim 1, wherein a lower side of the spring portion facing the main body comprises one or more chamfered or rounded-off edges, or wherein a lower side of the spring portion facing the main body comprises one or more chamfered or rounded-off edges at one or at both transitions between a lower wide side of the spring portion and one or both lateral narrow sides of the spring portion.

14. The connecting device in accordance with claim 1, wherein the main body and the one or more spring elements are manufactured with one another in one-piece manner, or in the form of a one-piece injection moulded component.

15. The connecting device in accordance with claim 1, wherein the spring portion at an end of the spring portion facing the main body has a width ($B_F$) which corresponds at least approximately to 20%, or to at least approximately 30% of the maximum width ($B_V$) of the main body.

16. The connecting device in accordance with claim 1, wherein the connecting element comprises two spring elements which are arranged and/or formed such as to be at least approximately mirror symmetrical to one another taken with respect to a transverse centre plane of the connecting element.

17. The connecting device in accordance with claim 1, wherein the connecting device comprises a mating connecting element which comprises one or more openings that are formed such as to be at least approximately complementary to a shape of an upper side of the at least one spring element.

18. The connecting device in accordance with claim 1, wherein the connecting device comprises the connecting element which is arranged on a first furniture component and a mating connecting element which is arranged on a second furniture component.

19. The connecting device in accordance with claim 1, wherein the connecting element is provided with one or more retaining projections which each comprise a curved supporting surface that is in the form of an arc of a circle in a longitudinal section.

20. An item of furniture comprising a plurality of components and one or more connecting devices in accordance with claim 1.

* * * * *